(12) United States Patent
Kwampian et al.

(10) Patent No.: US 8,686,066 B2
(45) Date of Patent: Apr. 1, 2014

(54) COMPOSITIONS INCLUDING POLYTETRAFLUOROETHYLENE AND PROCESSES FOR THE PREPARATION THEREOF

(76) Inventors: Suthep Kwampian, Rayong (TH); Ronnapa Phonthong, Rayong (TH); Worawan Lamtaptimthong, Rayong (TH)

( * ) Notice: Subject to any disclaimer, the term of this patent is extended or adjusted under 35 U.S.C. 154(b) by 0 days.

(21) Appl. No.: 13/376,598

(22) PCT Filed: May 25, 2011

(86) PCT No.: PCT/TH2011/000016
§ 371 (c)(1),
(2), (4) Date: Dec. 7, 2011

(87) PCT Pub. No.: WO2012/161666
PCT Pub. Date: Nov. 29, 2012

(65) Prior Publication Data
US 2012/0302702 A1      Nov. 29, 2012

(51) Int. Cl.
*C08F 212/10* (2006.01)
*C08L 27/18* (2006.01)
*C08J 3/12* (2006.01)
*C08L 25/12* (2006.01)

(52) U.S. Cl.
USPC .................. 523/201; 525/70; 525/71; 525/72

(58) Field of Classification Search
CPC .................................................... C08J 2425/12
USPC ............... 523/201; 525/66, 67, 70, 84, 71, 72
See application file for complete search history.

(56) References Cited

U.S. PATENT DOCUMENTS

| | | | |
|---|---|---|---|
| 5,804,654 A | 9/1998 | Lo | |
| 6,780,363 B2 | 8/2004 | Palamone | |
| 7,183,356 B2 | 2/2007 | Ishida | |

FOREIGN PATENT DOCUMENTS

| | | |
|---|---|---|
| KR | 10-2006-0099006 | 9/2006 |
| KR | 10-0852159 | 8/2008 |

*Primary Examiner* — Jeffrey Mullis
(74) *Attorney, Agent, or Firm* — Axis Intellectual Capital Pte Ltd.; Leif R. Sloan; Sonya C. Harris

(57) ABSTRACT

A process or method for preparing a composition that includes a core of polytetrafluoroethylene and a styrene/acrylonitrile shell (or a core-shell polytetrafluoroethylene including styrene/acrylonitrile (SAN) powder) is provided. The process includes a polymerisation process or reaction and a flocculation process or reaction. The temperatures utilized, and/or the relative quantities and/or concentrations of the reagents, for the polymerisation process and flocculation process are specifically selected. The core-shell polytetrafluoroethylene-based powder produced is used as an additive for plastic/polymers, for instance styrene-based polymers. The core-shell polytetrafluoroethylene-based powder produced is associated with improved workability and enhanced mechanical characteristics.

15 Claims, 2 Drawing Sheets

SEM picture of the core-shell PTFE-based powder

SEM picture of an existing PTFE powder

US 8,686,066 B2

COMPOSITIONS INCLUDING POLYTETRAFLUOROETHYLENE AND PROCESSES FOR THE PREPARATION THEREOF

TECHNICAL FIELD

The present disclosure relates generally to compositions or powders that include polytetrafluoroethylene (PTFE) and novel methods, processes, and techniques for preparing such compositions or powders. More specifically, the present disclosure relates to compositions and powders that include PTFE-based cores with styrene-acrylonitrile (SAN)-based shells, as well as methods, processes, and techniques for the preparation of such compositions and powders.

BACKGROUND

Polytetrafluoroethylene (PTFE) is a synthetic fluoropolymer of tetrafluoroethylene that has a wide range of applications and uses. PTFE is also commonly known as Teflon. PTFE is a high-molecular-weight compound that includes carbon and fluorine atoms. PTFE is heat resistant, ductile, and hydrophobic (i.e., lacks polar groups and therefore is insoluble in water and does not have water absorption properties). The high strength of carbon-fluorine bonds makes PTFE generally very unreactive, and hence PTFE is often used for manufacturing containers and pipework for reactive and/or corrosive chemicals. In addition, the high electronegativity of the fluorine atoms of PTFE causes PTFE to demonstrate mitigated London dispersion forces, and accordingly PTFE possesses a low (e.g., significantly low) coefficient of friction against any other solid. Therefore, PTFE is useful as a lubricant for reducing friction, wear, and energy consumption of machinery (or machine components).

There are many existing methods and techniques for preparing homogenous mixtures of synthetic polymeric resins with a wide variety of solid phase additives. For example U.S. Pat. No. 4,649,168 (Kress et al) discloses the dispersion of PTFE particles in aromatic polycarbonate resin based molding compositions. The dispersion is carried our by admixture of aqueous emulsion PTFE and aromatic polycarbonate resin followed by coagulation of the emulsion-mixture. However, while the process of U.S. Pat. No. 4,649,168 results in fine dispersions of PTFE in polycarbonate resin, the degree of dispersion is generally dependent upon a number of variables, each variable requiring close control. Therefore, there exist limitations in workability of PTFE compositions, as well as products manufactured from such PTFE compositions, associated with U.S. Pat. No. 4,649,168.

In addition, European patent document EP-A-0,166,187 describes a powder composition containing PTFE. The powder of EP-A-0,166,187 is obtained by mixing a dispersion of PTFE with a latex of grafted PTFE, filtering and drying in order to obtain a powder. However, existing powders obtained by co-precipitation (also known as co-coagulation or co-flocculation powders) tend to display high self-adhesion tendencies, particularly when the powders have a high PTFE content (e.g., 25% or more by weight). Accordingly, these powders generally cannot flow freely, thereby making such powders difficult to handle, work, and/or store.

There are several different existing methods, processes, and techniques for preparing or producing PTFE-based or containing compositions (e.g., powders), additives, and products. However, there exist a variety of drawbacks, disadvantages, and/or limitations with these existing methods and techniques. Specifically, many existing methods for preparing PTFE-based or containing compositions, additives, or products are often complicated and/or costly. Furthermore, existing PTFE-based or containing compositions, powders, and additives are generally associated with difficulties and/or limitations in relation to workability and/or storage.

SUMMARY

In accordance with a first aspect of the present disclosure, there is disclosed a process for preparing core-shell polytetrafluoroethylene including a polymerisation process and a flocculation process. The polymerisation process involves introducing polytetrafluoroethylene into a reactor, introducing an emulsifier into the reactor, the emulsifier comprising potassium hydroxide and SN-100 (oleic acid and stearic acid), introducing a catalyst into the reactor, and introducing a styrene monomer, a acrylonitrile monomer, and a copolymer of styrene and acrylonitrile into the reactor. The polymerisation process produces a core-shell polytetrafluoroethylene with SAN latex. The flocculation process utilises the core-shell polytetrafluoroethylene with SAN latex produced by the polymerisation process, a coagulant, a color stabilizer, and an antioxidant. The core-shell polytetrafluoroethylene with SAN latex is added to the coagulant, color stabilizer, and the antioxidant at a temperature of between approximately 85° C. and 90° C. Subsequently, the temperature is increased to between approximately 90° C. and 100° C. for facilitating the flocculation process. The flocculation process produces core-shell polytetrafluoroethylene with SAN powder.

In accordance with a second aspect of the present disclosure, there is disclosed a core-shell polytetrafluoroethylene with styrene-acrylonitrile composition that includes a core comprising polytetrafluoroethylene and a shell comprising styrene-acrylonitrile powder. The core-shell polytetrafluoroethylene is produced by both a polymerisation process and a flocculation process. The polymerisation process produces an intermediate product comprising core-shell polytetrafluoroethylene with SAN latex and the flocculation process produces the core-shell polytetrafluoroethylene with styrene-acrylonitrile composition.

BRIEF DESCRIPTION OF THE FIGURES

A description of embodiments of the present disclosure is provided below with reference to the figures, in which.

Figure 1:
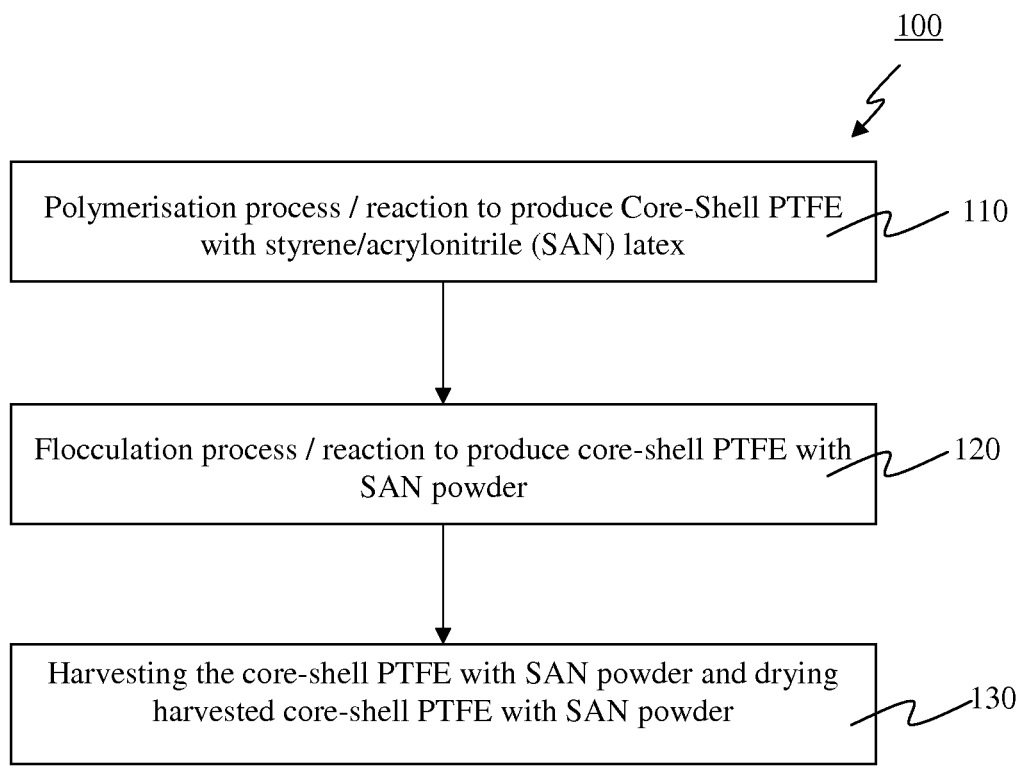
FIG. 1 is a flowchart of a process for preparing or producing compositions or powders including particles with a polytetrafluoroethylene-based core and styrene/acrylonitrile-based shell according to particular embodiments of the present disclosure.

Table 1 shows the composition of a flame retardant composition (A) according to an embodiment of the present disclosure;

Table 2 lists a number of properties of the flame retardant composition (A) of Table 1;

Table 3 shows the composition of a flame retardant composition (B) according to an embodiment of the present disclosure;

Table 5 lists a number of properties of the flame retardant composition (B) of Table 3;

Table 6 lists the reactants for a polymerisation process according to an embodiment of the present disclosure; and Table 7 lists the reactants for a flocculation process/reaction according to an embodiment of the present disclosure.

DETAILED DESCRIPTION

Embodiments of the present disclosure relate to novel methods, processes, or techniques for producing, preparing, or manufacturing polytetrafluoroethylene (PTFE) compositions, powders, substances, and/or additives. More specifically, most embodiments of the present disclosure relate to methods, processes, or techniques for producing, preparing, or manufacturing compositions or powders including core-shell particles with PTFE-based cores and styrene/acrylonitrile (SAN)-based shells. Compositions or powders manufactured in accordance with embodiments of the present disclosure can be referred to core-shell PTFE-based powders (or Graft Teflon powders).

The core-shell PTFE-based powders provided by various embodiments of the present disclosure have very good, good, or relatively good, compatibility with other polymers and/or plastic compounds or compositions, more specifically powder-based SAN polymers, acrylo/butadiene/styrene (ABS) polymers, and styrene-based polymers (PS).

The method, process, or technique of most embodiments includes an emulsion polymerisation process or reaction (also referred to as a polymerisation process) to thereby produce an intermediate product, followed by a flocculation process or reaction to thereby produce the core-shell PTFE-based powder (or Graft Teflon powder) as a final or resultant product.

The polymerisation process involves grafting, interacting, reacting, or combining PTFE, more specifically a dispersion (e.g., aqueous dispersion) of PTFE, with acrylonitrile and styrene (SAN) copolymer or SAN powder. The grafting of PTFE (e.g., the aqueous dispersion of PTFE) with the acrylonitrile and styrene (SAN) copolymer can facilitate or effectuate the formation or preparation of the intermediate product, more specifically a core-shell PTFE with SAN latex.

In the subsequent flocculation process, the core-shell PTFE with SAN latex (or the intermediate product) is reacted with a flocculant (or a coagulant) to thereby produce the resultant or final product (i.e., the core-shell PTFE-based powder). The core-shell PTFE-based powder includes a core based upon PTFE (or a PTFE core) and a shell of SAN (or a SAN shell). The core-shell PTFE-based powder of embodiments of the present disclosure is in a solid state or form, and therefore can be easily, more easily, or better mixed with other plastic or plastic-based powders for manufacturing or producing plastic products. In many embodiments, the core-shell PTFE-based powder is compatible with powder based SAN, ABS, and PS polymers due to the presence and/or effect of the acrylonitrile and styrene (SAN) copolymer on the surface of the PTFE core. Accordingly, there can be a good homogeneity achieved or established between the core-shell PTFE-based powder of various embodiments of the present disclosure and various existing and/or common plastic or plastic-based powders. This allows the core-shell PTFE-based powder of the present embodiment to be used and/or applied with many existing plastic or plastic-based powders. In addition, the use of core-shell PTFE-based powder provided by various embodiments as an additive in the manufacture or production of plastic products can provide said plastic products with enhanced mechanical properties (e.g., increased mechanical strength and/or better lubricative properties).

Representative aspects of methods, processes, and/or techniques for preparing, producing, and/or manufacturing polytetrafluoroethylene (PTFE)-based compositions, powders, substances, and/or additives that include a particles with PTFE-based cores and SAN shells (also referred to core-shell PTFE-based powders), are described in detail hereinafter with reference to FIG. 1. Embodiments provided by the present disclosure are not precluded from applications in which particular fundamental functional, technical, structural, and/or operational principles present among the various embodiments described herein are desired.

Aspects of Method or Process 100 Embodiments

FIG. 1 is a flowchart of a process 100 for preparing or producing powders that include core-shell particles with polytetrafluoroethylene (PTFE)-based cores and styrene/acrylonitrile (SAN) shells in accordance with particular embodiments of the present disclosure.

Polymerisation Process

In a first process portion 110, a polymerisation process, more specifically a polymerisation process that applies, adopts, or uses a grafting process or technique, is performed. Grafting processes are known in the art and are, for example, as described in *Emulsion Polymerization Theory and Practice*, D. C. Blackley, Applied Science Publishers Ltd, London, 1975.

A number or set of different reagents or reactants is required or used with the polymerisation process. In many embodiments, the set of reagents or reactants include PTFE, more specifically an aqueous dispersion of PTFE. In addition, the set of reagents or reactants used in the polymerisation process include styrene/acrylonitrile copolymer, styrene monomer, acrylonitrile monomer, SN 100 (oleic acid and stearic acid) (e.g., SN 100 as manufactured by Nippon Oils & Fats Co. Ltd. Japan), potassium persulfate ($K_2S_2O_8$), and potassium hydroxide (KOH) (e.g., KOH as manufactured by AGC Chemical (Thailand) Co., Ltd.).

The relative quantities and/or concentrations of each reactant of the set of reactants for the polymerisation process can be selected and varied, for instance depending on a target speed of reaction and/or a target or intended relative component composition of the intermediate product formed via the first process portion 110.

In many embodiments, the set of reagents include between approximately 45%-55% (e.g., approximately 50%) by weight of PTFE, between approximately 10% and 20% (e.g., approximately 15%) by weight of the styrene/acrylonitrile (SAN) copolymer, between approximately 22.5% and 27.5% (e.g., approximately 26.25%) by weight of the styrene monomer, and between approximately 7.5% and 10% (e.g., approximately 8.75%) by weight of the acrylonitrile monomer.

The set of reagents can include a resin including an emulsion of PTFE and SAN as well as the styrene monomer and acrylonitrile monomer. The set of reagents can further include at least approximately 1 part per hundred of resin (phr) of SN 100, for instance approximately 1.5phr of SN 100. In addition, the set of reagents can include between approximately 0.25phr and 0.5phr of $K_2S_2O_8$, more specifically between approximately 0.30phr and 0.35phr of $K_2S_2O_8$. Furthermore, the set of reagents can include between approximately 0.300phr and 0.320phr of KOH, more specifically between approximately 0.310phr and 0.315phr of KOH.

The first process portion 110, more specifically the polymerisation process of the first process portion 110, is conducted or performed in a reactor, for example a 20-liter reactor. It will be understood that other reactors of different volumes can also be used for the polymerisation process. The process 100 of many embodiments can be easily and/or conveniently scaled for industrial manufacture or production of the core-shell PTFE-based powder.

In many embodiments, PTFE is introduced into the reactor in the form of a suspension or an aqueous dispersion with a total solid content of approximately 60%. The copolymer of styrene and acrylonitrile (i.e., SAN copolymer) can be added into the reactor as an emulsion.

Upon addition of PTFE and the copolymer of styrene and acrylonitrile into the reactor, the contents of the reactor can be stirred to mix and/or homogenize using a stirrer or agitator. The temperature of the reactor can be increased to between approximately 60° C. and 70° C., for example approximately 65° C., by using a heating system, for example a hot steam jacket system. Other heating systems, for instance heating systems or heaters known in the related art, can also be used for changing, and/or maintaining, the temperature of the reactor.

When the temperature has been raised, and is maintained at the raised temperature (e.g., between approximately 60° C. and 70° C.), each of the styrene monomer and the acrylonitrile monomer is then added into the reactor in solution form. In addition, $K_2S_2O_8$ can be added into the reactor subsequent the increase in reactor temperature (e.g., to between approximately 60° C. and 70° C.). $K_2S_2O_8$ serves as a catalyst for the polymerisation process. $K_2S_2O_8$ can be introduced into the reactor as an aqueous solution.

$K_2S_2O_8$ can be introduced into the reactor immediately or substantially immediately upon reaching the intended or target temperature. In several embodiments, each of the styrene monomer and the acrylonitrile monomer is added into the reactor immediately, or substantially immediately, upon reaching the intended or target reactor temperature (e.g., approximately 65° C.). More specifically, a predetermined quantity of the styrene monomer and acrylonitrile monomer (or a specific percentage of total or final amount of styrene monomer and acrylonitrile monomer) can be first added into the reactor upon reaching the intended or target reactor temperature. For instance, between approximately 5% and 20% (e.g., approximately 10%) of total or final amount of styrene monomer and acrylonitrile monomer can be immediately or substantially immediately added into the reactor upon reaching the intended or target reactor temperature.

Another predetermined quantity of the styrene monomer and acrylonitrile monomer, or the remainder of the total or final amount of styrene monomer and acrylonitrile monomer, can then be added into the reactor over a time period of between 4 hours and 5 hours, for example approximately 4.5 hours.

SN 100 and KOH are also added into the reactor. SN 100 and KOH can collectively function, and can accordingly be referred to, as a controlling emulsion system (or an emulsifier). The emulsifier (i.e., the mixture SN 100 and KOH) can be introduced into the reactor subsequent the addition of $K_2S_2O_8$ into the reactor.

In several embodiments, the emulsifier (i.e., the mixture SN 100 and KOH) can be introduced over a time period of between approximately 4 hours and 5 hours, for example approximately 4.5 hours. In various embodiments, the styrene monomer and acrylonitrile monomer are introduced into the reactor together with the introduction of the emulsifier into the reactor over the 4.5 hours duration.

During addition of the emulsifier (i.e., the mixture of SN 100 and KOH) into the reactor, the temperature of the reactor can be maintained at between approximately 60° C. and 70° C., for example at approximately 65° C.

In multiple embodiments of the present disclosure, the monomer solutions of styrene and acrylonitrile can be added into the reactor during each of the introduction of catalyst (i.e., $K_2S_2O_8$) into the reactor and introduction of the emulsifier (i.e., the mixture of SN 100 and KOH) into the reactor. More specifically, between approximately 5% and 20%, for example approximately 10%, of the monomer solution of styrene and the monomer solution of acrylonitrile can be simultaneously added into the reactor with the catalyst (i.e., $K_2S_2O_8$); and between approximately 80% and 95%, for example approximately 90%, (i.e., the remainder) of the said two monomer solutions can be subsequently simultaneously added into the reactor with the emulsifier (i.e., SN 100 and KOH).

Subsequent the addition of the emulsifier (i.e., the mixture SN 100 and KOH), the temperature of the reactor can be increased, for example increased by between approximately 2° C. and 5° C. (e.g., from approximately 65° C. to approximately 68° C.). The increased or elevated temperature can be maintained for between approximately 2 hours and 3 hours, for example for approximately 2.5 hours. By maintaining the temperature for said period of time (e.g, approximately 2.5 hours), the polymerisation process of the first process portion 110 can be completed.

The reactor can then be cooled. In many embodiments of the present disclosure, the first process portion 110 produces an intermediate product, more specifically the core-shell PTFE-based latex. The core-shell PTFE-based latex includes core-shell particles with PTFE-based cores and SAN-based shells that surround, or at least substantially surround, the PTFE-based cores. The core-shell PTFE-based latex (or the intermediate product) exists as a suspension, emulsion, or solution.

The present disclosure further includes the use or performance of a flocculation process subsequent the polymerisation process for manufacturing or producing core-shell PTFE-based powders (i.e., the final or resultant product). The core-shell PTFE-based powder exists in a solid, or at least substantially solid, state. In several embodiments, the solid core-shell PTFE-based powders have an increase compatibility with other plastic powders, thereby enhancing or increasing the ease and/or efficiency associated with mixing of the solid core-shell PTFE-based powders with other plastic powders, for instance during a compounding process for manufacture of plastic or plastic-based products.

In addition, the present disclosure details novel temperatures, reagent combinations, relative reagent concentrations and/or quantities, and/or durations during portion(s) of the polymerisation process for manufacturing or producing the core-shell PTFE-based latex (or the intermediate product). The use of such novel temperatures, reagent combinations, relative reagent concentrations and/or quantities, and/or durations during portion(s) of the polymerisation process can facilitate or enable production of core-shell PTFE-based powders (or the final product) that have significantly, surprisingly, and/or unexpectedly enhanced properties or characteristics.

Flocculation Process

In a second process portion 120, a flocculation process or reaction is performed. The flocculation process or reaction is performed or carried out using a set of flocculation reagents or reactants.

Flocculation is generally defined as a process whereby colloids are formed in suspension (or as suspended in a liquid). During flocculation, fine particulates agglomerate or clump together in a floc. In other words, individual dispersed particles agglomerate or cluster together during flocculation. The floc may float up or accumulate at the top of the liquid or settle at the bottom of the liquid, and can be separated or harvested via a filtration process.

The set of flocculation reactants includes the intermediate product (i.e., the core-shell PTFE-based latex) formed or produced by the first process portion 110. In addition, the set of flocculation reactants includes a coagulant, a color stabilizer, and an antioxidant substance, compound, or composition. In several embodiments, the color stabilizer includes tetrasodium pyrophosphate (TSPP), sodium formaldehyde sulfoxylate (SFS), and/or potassium hydroxide (KOH). In addition, the antioxidant substance is, or includes antioxidant-aquanox LDLA, and the coagulant includes anhydrous magnesium sulphate ($MgSO_4.7H_2O$) and phosphoric acid ($H_3PO_4$).

In several embodiments, the set of flocculation reactants includes 100% by weight of the core-shell PTFE with SAN latex. In addition, the set of flocculation reactants can include between approximately 0.08phr and 0.12phr, for example approximately 0.1phr, of TSPP, between approximately 0.08phr and 0.12phr, for example approximately 0.1phr, of SFS, between approximately 0.18phr and 0.25phr, for example approximately 0.21phr, of KOH, between approximately 8.470phr and 8.480, for example approximately 8.474phr of demineralized water or water demineralized supply (WDS), between approximately 0.5phr and 0.7phr, for example approximately 0.6phr, of antioxidant-aquanox LDLA, between approximately 5.020phr and 5.030phr, for example approximately 5.025phr of $MgSO_4.7H_2O$, and between approximately 1.670phr and 1.680phr, for example approximately 1.675phr, of $H_3PO_4$. The demineralized water can function as a solvent for TSPP, SFS, and/or KOH.

In multiple embodiments, the flocculation process can start by preparing a latex masterbatch by mixing together the core-shell PTFE-based powder (also known as the intermediate product or the Graft PTFE latex) with a color stabilizer and an antioxidant substance. As mentioned above, the color stabilizer solution can include TSPP, SFS, and KOH. The antioxidant substance is, or includes, antioxidant aquanox LDLA.

In many embodiments, the flocculation process occurs or is performed in a reactor, for example a 15-liter reactor. The volume or capacity of the reactor for the flocculation process can be increased, for example for preparing or manufacturing core-shell PTFE-based powder on an industrial scale.

The 15-liter reactor can be filled with water, for instance with 12 liters of water. In addition, the coagulant is added to the reactor. The coagulant includes one or both of $MgSO_4$ and $H_3PO_4$.

In many embodiments, the coagulant includes a mixture of $MgSO_4$ and $H_3PO_4$. Where the coagulant includes both $MgSO_4$ and $H_3PO_4$, the concentration of $MgSO_4$ present in the coagulant can be between approximately 4.5phr and 5.5.phr, and more specifically between approximately 4.75phr and 5.25phr. In addition, the concentration of $H_3PO_4$ in the coagulant can be between 1phr and 2.5phr, and more specifically between 1.25phr and 1.75phr. In specific embodiments, where the coagulant includes a mixture of $MgSO_4$ and $H_3PO_4$, the concentration of $MgSO_4$ of the coagulant is approximately 5.025phr and the concentration of $H_3PO_4$ of the coagulant is approximately 1.675phr.

In embodiments wherein the coagulant includes only $MgSO_4$, the concentration of $MgSO_4$ is between approximately 4.0phr and 7.5phr, and more specifically between approximately 5.0phr and 7.0phr. In specific embodiments, the concentration of $MgSO_4$ is approximately 6.7phr.

In embodiments wherein the coagulant includes only $H_3PO_4$, the concentration of $H_3PO_4$ is between approximately 4.0phr and 7.5phr, and more specifically between approximately 4.5phr and 6.0phr. In specific embodiments, the concentration of $H_3PO_4$ is approximately 5.2phr.

After adding the coagulant in to the reactor, the temperature of the reactor is increased to between approximately 85° C. and 90° C., for example between approximately 86° C. and 89° C. The temperature is maintained at this raised temperature of between approximately 85° C. and 90° C.

Subsequently, the latex masterbatch (i.e., the mixture of the core-shell PTFE-based powder (or the intermediate product), color stabilizer, and antioxidant substance) is added into the reactor. The latex masterbatch can be introduced into the reactor at a controlled rate.

Flocculation reaction occurs between the coagulant and the core-shell PTFE-based latex in the reactor. More specifically, flocculation of the core-shell particles that includes PTFE-based cores and SAN-based shells occurs in the reactor with the facilitation or help of the coagulant. The temperature of the reactant is maintained at between approximately 85° C. and 90° C., for example between approximately 86° C. and 89° C., during the addition of the latex masterbatch into the reactor.

Subsequent the addition of the core-shell PTFE-based latex (as well as the other reagents of the set of reagents) into the reactor, the reactor temperature can then raised to between approximately 90° C. and 95° C., for example between approximately 92° C. and 94° C. The raised temperature, for example the temperature of between approximately 92° C. and 94° C., facilitates or enables the flocculation process. The time duration for flocculation (e.g., for completing the flocculation process) can be controlled, and can be for example between 15 minutes and 30 minutes.

The flocculation process produces a resultant product, which is a core-shell PTFE-based powder. The core-shell PTFE-based powder is produced as a suspended substance, product, or powder in water. More specifically, the core-shell PTFE-based powder includes solid particles with PTFE-based cores and SAN-based shells surrounding, or at least substantially surrounding, the PTFE-based cores.

In a third process portion 130, the produced or prepared core-shell PTFE-based powder is harvested or separated from water (and/or any residual unreacted reactants) present in the reactor, for example by a filtration process. The harvested or separated core-shell PTFE-based powder is then dried. Drying of the core-shell PTFE-based powder can be performed via a baking process in an oven at a temperature of between approximately 75° C. and 90° C., for example at approximately 80° C., over a predetermined period of time, for example 24 hours.

The core-shell PTFE-based powder provided by various embodiments of the present disclosure can be used to manufacture plastics or plastic products. For example, the core-shell PTFE-based powder can be used as additives in the manufacture of styrene-based polymers and plastics. The core-shell PTFE-based powder provided by various embodiments is compatible with styrene-based polymers and plastics. When used as additives, the core-shell PTFE-based powder of particular embodiments of the present disclosure provides improved or enhances processibility and/or improves mechanical properties (e.g., increased wear resistance or lower surface roughness). In addition, the core-shell PTFE-based powder is easy to handle and work with (i.e., has an enhanced workability and/or handling ease). For instance, the core-shell PTFE-based powder can display enhanced flowability characteristics and reduced agglomeration as compared to existing PTFE powders. When used for manufacturing plastic products, the core-shell PTFE-based powder can facilitate or enable the manufactured plastic products to have a smooth or substantially smooth surface.

In several embodiments, the core-shell PTFE-based powder has good compatibility with powder based styrene/acrylonitrile polymers, acrylonitrile/butadiene/styrene (ABS) polymers, and styrene-based polymers. The core-shell PTFE-based powder can be used or combined with other plastic-based resins to produce flame retardant compositions with flame retardant properties.

For instance, the core-shell PTFE-based powder can be mixed with a base resin, which includes acrylonitrile/butadiene/styrene (ABS) powder and styrene/acrylonitrile (SAN) resin, for producing a flame retardant composition with flame retardant applications. Table 1 below lists the components of a flame retardant composition (A) including the base resin and a flame additive or retardant compound that includes the core-shell PTFE-based powder. The properties, more specifically flame retardant related properties, of the flame retardant composition (A) are shown in Table 2.

TABLE 1

Components of Flame Retardant Composition (A).

| Base Resin (%) | |
|---|---|
| ABS powder | 36 |
| SAN resin | 64 |
| Additive (phr) | |
| Flame retardant | 17.5 |
| Flame synnergist | 4 |
| Internal lubricant A | 0.05 |
| Internal lubricant B | 0.5 |
| Core-shell PTFE-based powder | 0.5 |

TABLE 2

Properties of Flame Retardant Composition (A).

| Properties | Unit | Achieved Level |
|---|---|---|
| MFI (200° C./5 kg) | g/10 min | 3.0-5.0 |
| Notched Impact Strength (NI) | kg-cm/cm$^2$ | 9.0-12.0 |
| Rockwell hardness (HR) | R-scale | 108-115 |
| Tensile Strength (TS) | kg/cm$^2$ | 520-540 |
| Elongation (EL) | % | 10-30 |
| Flexural Strength (FS) | kg/cm$^2$ | 650-700 |
| Flexural Modulus (FM) | 10$^4$ kg/cm$^2$ | 2.20-2.40 |
| Heat Distortion Temperature HDT | ° C. | 75-85 |
| Underwriter's Laboratories Flammability Standard-94 (UL-94) | — | V-0 |

As can been seen from the values of Table 1, the core-shell PTFE-based powder exhibits compatibility or good compatibility with the base resin, which includes ABS powder and SAN resin. The values shown in Table 2 indicate that the core-shell PTFE-based powder can be incorporated into, or used as part of, an additive (e.g., an anti-dripping additive) that is combined or mixed with a base resin to produce a flame retardant composition or compound. The values shown in Table 2 indicate that the additive that includes the core-shell PTFE-based powder exhibits compatibility or good compatibility with base resins that include ABS powder and SAN resin. Additives including core-shell PTFE-based powders of various embodiments of the present disclosure can be mixed, combined, or incorporated with base resins that include ABS powder and SAN resin to produce flame retardant compounds having flame retardant properties.

In several embodiments, inclusion of the core-shell PTFE-based powder into a flame retardant composition or compound (e.g., flame retardant composition (A)) improves the flame retardant properties of said flame retardant composition. Such improvement(s) to the flame retardant properties of a particular flame retardant composition due to the inclusion of the core-shell PTFE-based powder can be significant, unexpected, and/or unforeseen.

In addition, in particular embodiments, a flame retardant additive including core-shell PTFE-based powder can be mixed with a base resin that includes acrylonitrile/butadiene/styrene (ABS) powder and polycarbonate (PC) resin to produce a flame retardant composition (B). Table 3 below lists the components of a flame retardant composition (B). The properties, more specifically flame retardant related properties, of the flame retardant composition (B) are shown in Table 4.

TABLE 3

Components of Flame Retardant Composition (B).

| Base Resin (%) | |
|---|---|
| ABS powder | 15 |
| PC Resin | 85 |
| Additive (phr) | |
| Flame retardant | 15 |
| Internal lubricant A | 0.05 |
| Internal lubricant B | 0.2 |
| Core-Shell PTFE-based powder | 1.0 |

TABLE 4

Properties of Flame Retardant Composition (B).

| Properties | Unit | The accomplished recipe |
|---|---|---|
| MFI (200° C./5 kg) | g/10 min | 50-60 |
| Notched Impact Strength (NI) | kg-cm/cm$^2$ | 50-60 |
| Rockwell hardness (HR) | R-Scale | 110-120 |
| Tensile Strength (TS) | kg/cm$^2$ | 450-550 |
| Elongation (EL) | % | 30-70 |
| Flexural Strength (FS) | kg/cm$^2$ | 650-750 |
| Flexural Modulus (FM) | 10$^4$ kg/cm$^2$ | 2.2-2.4 |
| Heat Distortion Temperature HDT | ° C. | 70-80 |
| Underwriter's Laboratories Flammability Standard-94 (UL-94) | — | V-0 |

As can been seen from the values of Table 3, the additive including core-shell PTFE-based powder exhibits compatibility or good compatibility with the base resin that includes ABS powder and polycarbonate (PC) resin.

The values shown in Table 4 indicate that particular additives including core-shell PTFE-based powder can be mixed or combined with base reins including ABS powder and PC resin to produce a flame retardant composition with flame retardant applications. Mixing additives that include the core-shell PTFE-based powder with base resins that include ABS powder and PC resin does not adversely affect, and can even improve, the flame retardant properties or capacity of said base resins.

In addition, the values shown in Table 4 indicate that adding particular additives that include the core-shell PTFE-based powder to base resins with ABS powder and PC resin can produce flame retardant compositions (e.g., flame retardant composition (B)) with significantly and/or unexpectedly improved flame retardant properties.

The core-shell PTFE-based powder of various embodiments of the present disclosure exhibits enhances flowability (i.e., increased flow rate) as compared to existing PTFE compositions or powders. In addition, the core-shell PTFE powder can display reduced levels of agglomeration as compared to existing PTFE compositions or powders. Table 5 below shows flow rate associated with a particular core-shell PTFE-based powder of the present disclosure as compared to an existing PTFE powder.

TABLE 5

Flowability of a core-shell PTFE-based powder and a existing PTFE-based powder

| Sample | Flow Rate (gram/min) (at room temperature) |
| --- | --- |
| Core-shell PTFE-based powder | 1173 |
| Existing PTFE-based powder | Agglomeration observed |

As seen from the values of Table 5, the core-shell PTFE-based powder of particular embodiments of the present disclosure has a significantly enhanced or increased flow rate as compared to existing PTFE-based powders. In some embodiments, the core-shell PTFE-based powder exhibits a flow rate of at least approximately 1000 gram/min at room temperature. In various embodiments, the core-shell PTFE-based powder exhibits a flow rate of at least approximately 1100 gram/min, for example between 1150 gram/min and 1200 gram/min, at room temperature. This increase in flowability (or flow rate) of core-shell PTFE-based powders of various embodiments of the present disclosure as compared to existing PTFE-based powders can be significant and/or unforeseen or unexpected.

In several embodiments, the core-shell PTFE-based powder is spherical or substantially spherical, and does not include fibril or fibril-like structures. The absence of fibril or fibril-like structures in the core-shell PTFE powder can improve the dispersion-related properties or characteristics of said core-shell PTFE powder and/or increase the ability of the core-shell PTFE-based particles to mix with other known plastic powders (i.e., the compatibility of the core-shell PTFE powder with other plastic powders).

The example provided below serves to enhance clarity and/or appreciation for particular embodiments of the present disclosure. It will be understood that the scope of the present disclosure is not limited in any way by the example described below. The example provided is solely for aiding or enabling the reader to have a better understanding and/or appreciation of particular embodiments of the present disclosure.

EXAMPLE ONE

A process for preparing, manufacturing, or producing a composition or powder that includes core-shell particles with polytetrafluoroethylene (PTFE)-based cores and styrene/acrylonitrile (SAN)-based shells provided by an embodiment of the present disclosure is described in Example one.

The process includes a polymerisation process for producing a core-shell PTFE-based latex, which is an intermediate product that exists as an emulsion or suspension. The process also includes a flocculation process via which solid core-shell particles with PTFE-based cores and SAN-based shells are produced.

Reactants for the polymerisation process are summarized in Table 6 below. The polymerisation process is performed in a 20-liter reactor by introducing a dispersion of PTFE at a solid content of 60% and an aqueous copolymer of styrene and acrylonitrile. The contents of the reactor are then stirred using a stirrer or agitator.

The temperature of the reactor is then increased to 65° C. by using a hot steam jacket system. Monomer solutions of styrene and acrylonitrile are then added into the reactor together with a catalyst. The catalyst is $K_2S_2O_8$. The catalyst or $K_2S_2O_8$ is at 0.31 part by weight. The temperature is maintained at 65° C. for approximately 30 minutes subsequent the addition of $K_2S_2O_8$.

An emulsifier is then added into the reactor. The emulsifier includes SN 100 and KOH. The emulsifier includes KOH at 0.312 part by weight and SN 100 at 1.5 part by weight. The emulsifier is added together with the monomer solutions. Addition of the emulsifier and the monomer solutions occurs continuously over approximately 4.5 hours with the temperature maintained at 65° C. The monomer solutions can include styrene at 26.25 part by weight and acrylonitrile at 8.75 part by weight. After addition of the emulsifier and monomer solutions, the temperature is maintained at 65° C. for approximately 30 minutes before the temperature is then increased to approximately 68° C. for about 2.5 hours.

The reactor is then cooled. The polymerisation process produces core-shell PTFE-based latex (also known as an intermediate produce or graft Teflon or PTFE latex).

The process further includes a flocculation process subsequent the polymerisation process. Reactants for the flocculation process are summarized in Table 7 below. The flocculation process starts by mixing the core-shell PTFE-based latex with a color stabilizer and an antioxidant substance to produce a latex masterbatch. More specifically, 0.1 part by weight of tetrasodium pyrophosphate (TSPP), 0.1 part by weight of sodium formaldehyde sulfoxylate (SFS), and 0.21 part by weight of potassium hydroxide (KOH) is mixed with the core-shell PTFE-based latex. In addition 0.6 part by weight of Aquanox LDLA (i.e., the antioxidant substance) is mixed with the core-shell PTFE-based latex.

The flocculation process occurs in a 15-liter reactor. The 15-liter reactor is filled with 12 liters of water and a coagulant. The coagulant includes 5.025 part by weight of magnesium sulfate and 1.675 part by weight of phosphoric acid. The temperature of the reactor is then increased to between approximately 86° C. to 89° C. The latex masterbatch is then added into the reactor at a controlled rate. The temperature of the reactor is then increased to between approximately 92° C. and 94° C. Time taken for flocculation is between approximately 15 minutes and 30 minutes. The flocculation reaction or process produces core-shell PTFE-based powder. The core-shell PTFE-based powder can be separated, isolated, and harvested from the reactor (and from the residual reactants still present in the reactor). A filtration process can be performed for separating or harvesting the core-shell PTFE-based powder. The core-shell PTFE-based powder is then dried in an oven at approximately 80° C. over approximately 24 hours to thereby produce or obtain dried or anhydrous core-shell PTFE-based powder. The dried core-shell PTFE-based powder, which is the resultant or final product of the process, can be a spherical or substantially spherical particle.

Scanning electron microscopic (SEM) pictures were obtained of the dried core-shell PTFE-based powder (i.e., the product of the process of Example One). The SEM pictures of the dried core-shell PTFE-based powder were compared to SEM pictures of existing PTFE powders to evaluate the properties (e.g., relative structural properties) of the dried core-shell PTFE-based powder of the present disclosure and existing core-shell PTFE-based powder.

Figure 2A:
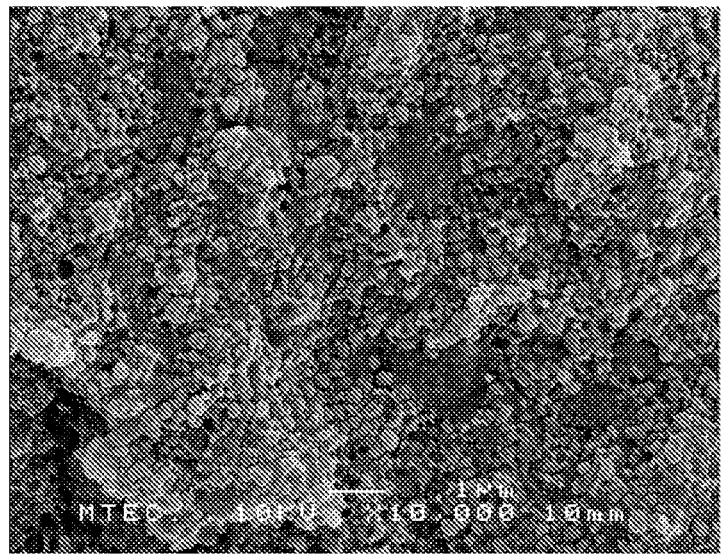
FIG. 2a is a SEM picture of an existing PTFE powder.
Figure 2B:
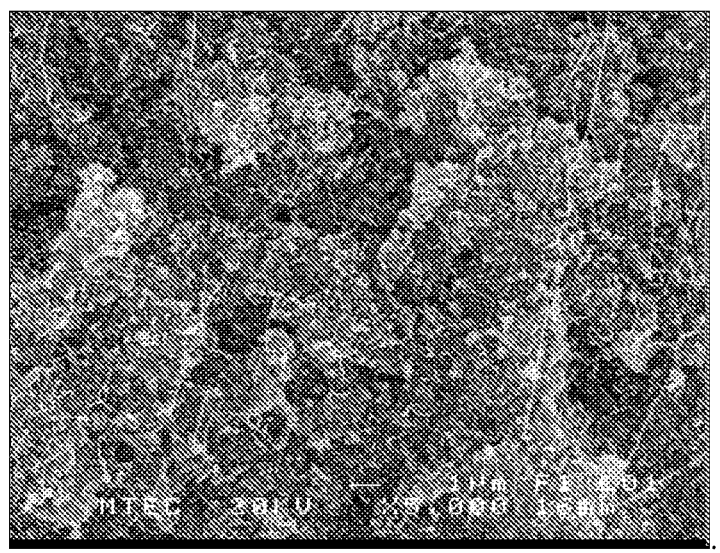
FIG. 2b is a SEM picture of a core-shell PTFE-based powder of an embodiment of the present disclosure.

FIG. 2a shows a SEM picture of the dried core-shell PTFE-based powders produced by particular processes of the present disclosure (e.g., the process of Example One) and FIG. 2b shows a SEM picture of an existing PTFE powder. As shown in FIG. 2b, existing PTFE powders include fibril structures. The fibril structures can be dispersed throughout existing PTFE powders. The fibril structures can cause difficulty in PTFE powder dispersion. In addition, the fibril structures present in existing PTFE powders can adversely impact or influence their ability to mix with other plastic powders and hence reduce the workability of such existing PTFE powders.

As shown in FIG. 2a, the dried core-shell PTFE-based particles produced by particular processes of the present disclosure are spherical or substantially spherical. The dried core-shell PTFE-based particles do not appear to include fibril or fibril-like structures. The spherical or substantially spherical structure of the dried core-shell PTFE-based particles can help improve dispersion-related characteristics thereof, and increase the ability of the dried core-shell PTFE-based particles to mix with other known plastic powders.

TABLE 6

Reactants for the polymerisation process

| Reactants/Reagents | Quantity |
|---|---|
| Dispersion of PTFE | 50% by weight |
| Copolymer of styrene and acrylonitrile | 15% by weight |
| Styrene monomer | 26.25% by weight |
| Acrylonitrile | 8.75% by weight |
| SN 100 (oleic acid and stearic acid) | 1.5 phr |
| $K_2S_2O_8$ | 0.31 phr |
| Potassium hydroxide (KOH) | 0.312 phr |

TABLE 7

Reactants for the flocculation process/reaction

| Reactants/Reagents | Quantity |
|---|---|
| Core-shell PTFE with SAN latex | 100% by weight |
| Tetrasodium pyrophosphate (TSPP) | 0.1 phr |
| Sodium formaldehyde sulfoxylate (SFS) | 0.1 phr |
| Potassium hydroxide (KOH) | 0.21 phr |
| WDS | 8.474 phr |
| Antioxidant-Aquanox LDLA | 0.6 phr |
| $MgSO_4 \cdot 7H_2O$ | 5.025 phr |
| Phosphoric acid ($H_3PO_4$) | 1.675 phr |

Embodiments of the present disclosure relate to methods, processes, and techniques for preparing, producing, or manufacturing compositions or powders that include core-shell particles with PTFE-based cores and SAN-based shells (also referred to as core-shell PTFE-based powders). The core-shell PTFE-based powders exist in solid form, thereby facilitating and/or enhancing their compatibility to mix with other known plastic powders, for instance during a compounding process for manufacturing plastic products. The process of embodiments of the present disclosure includes or involves a polymerisation process or reaction as well as a flocculation process or reaction.

The polymerisation process produces core-shell PTFE-based latex (also known as a graft Teflon or PTFE latex). This core-shell PTFE-based latex is used as a raw material in the flocculation process for the production or preparation of core-shell PTFE-based powder. The core-shell PTFE-based powder produced by various embodiments of the present disclosure can be used as an additive in production or manufacture of plastics (or polymers). More specifically, the core-shell PTFE-based powder produced via processes provided by various embodiments of the present disclosure show or display high homogeneity with other plastic polymers, for instance styrene polymers. In addition, the core-shell PTFE-based powder produced via processes provided by various embodiments of the present disclosure can provide enhanced or improved mechanical properties (e.g., higher mechanical strength and/or smoother surface characteristics) when used as an additive in manufacture of plastic (or polymer) products.

Particular embodiments of the disclosure are described above for providing novel, inventive, advantageous, and/or enhanced methods, processes, and/or techniques for preparing, manufacturing, or producing compositions and powders that include core-shell particles with PTFE-based cores and SAN-based shells. While features, functions, processes, process portions, advantages, and alternatives associated with certain embodiments have been described within the context of those embodiments, other embodiments may also exhibit such advantages, and not all embodiments need necessarily exhibit such advantages to fall within the scope of the disclosure. It will be appreciated that several of the above-disclosed features, functions, processes, process portions, advantages, and alternatives thereof, may be desirably combined into other different methods, processes, systems, or applications. The above-disclosed features, functions, processes, process portions, or alternatives thereof, as well as various presently unforeseen or unanticipated alternatives, modifications, variations or improvements thereto that may be subsequently made by one of ordinary skill in the art, are encompassed by the following claims.

The invention claimed is:

1. A process for producing core-shell polytetrafluoroethylene-based powder comprising polytetrafluoroethylene-based cores and styrene/acrylonitrile copolymer-based shells, the process comprising:
a polymerisation process comprising:
introducing an aqueous dispersion of polytetrafluoroethylene into a reactor;
introducing an emulsifier into the reactor,;
introducing a catalyst into the reactor; and
introducing a styrene monomer, an acrylonitrile monomer, and a copolymer of styrene and acrylonitrile into the reactor, wherein the polymerisation process produces a core-shell polytetrafluoroethylene-based latex;
wherein the polymerisation process comprises introducing between about 45% and 55% by weight of polytetrafluoroethylene, about 10% to 20% by weight of the copolymer of styrene and acrylonitrile, about 25% and 27.5% by weight of styrene monomer and about 5% and 10% by weight of acrylonitrile monomer into the reactor;
wherein the emulsifier comprises potassium hydroxide and a mixture of oleic acid and stearic acid;
wherein the catalyst is potassium persulfate; and a flocculation process comprising:
introducing the core-shell polytetrafluoroethylene-based latex to a coagulant, a color stabilizer, and an antioxidant at a temperature of between about 85° C. and 90° C.;
wherein the coagulant comprises magnesium sulfate and phosphoric acid; and
increasing the temperature to between about 90° C. and 100° C. for one of facilitating and effectuating flocculation of the core-shell polytetrafluoroethylene-based latex, wherein the flocculation process produces core-shell polytetrafluoroethylene-based powder.

2. The process as in claim 1, wherein the polymerisation process comprises introducing about 50% by weight of polytetrafluoroethylene, about 15% by weight of the copolymer of styrene and acrylonitrile, about 26.25% by weight of styrene monomer and about 8.75% by weight of acrylonitrile monomer into the reactor.

3. The process as in claim 1, wherein the polymerisation process comprises introducing the emulsifier having 0.312 part by weight of potassium hydroxide and 1.5 part by weight of the mixture of oleic acid and stearic acid.

4. The process as in claim 1, wherein approximately 0.31 part by weight of potassium persulfate is added into the reactor for the polymerisation reaction.

5. The process as in claim 1, wherein the polymerisation process comprises:
introducing the catalyst together with about 10% of the styrene monomer and the acrylonitrile monomer into the reactor; and
introducing the emulsifier together with about 90% of the styrene monomer and the acrylonitrile monomer subsequent the introduction of the catalyst into the reactor.

6. The process as in claim 5, wherein the temperature of the reactor is maintained at between about 63° C. and 67° C. during introduction of the catalyst into the reactor.

7. The process as in claim 6, wherein the temperature of the reactor is maintained at between about 63° C. and 67° C. during introduction of the emulsifier into the reactor.

8. The process as in claim 7, wherein the emulsifier is introduced into the reactor over a time period of between 4 hours and 5 hours.

9. The process as in claim 5, wherein the temperature of the reactor is increased to between about 67° C. and 70° C. subsequent the introduction of the catalyst and emulsifier into the reactor, said increased temperature maintained for a time duration of between 2 hours and 3 hours for one of facilitating and effectuating completion of the polymerisation process.

10. The process as in claim 1, wherein the color stabilizer comprises tetrasodium pyrophosphate, sodium formaldehyde sulfoxylate, and potassium hydroxide.

11. The process as is claim 10, wherein the flocculation process utilises about 0.1 part by weight of tetrasodium pyrophosphate, about 0.1 part by weight of sodium formaldehyde sulfoxylate, about 0.21 part by weight of potassium hydroxide, about 0.6 part by weight of antioxidant, about 5.025 part by weight of magnesium sulfate, and about 1.675 part by weight of phosphoric acid.

12. The process as in claim 10, wherein introducing of the core-shell polytetrafluoroethylene-based latex to the coagulant, color stabilizer, and antioxidant occurs at a temperature of between about 86° C. and 89° C.

13. The process as in claim 12, wherein the temperature is increased to between 92° C. and 94° C. subsequent introduction of the core-shell polytetrafluoroethylene-based latex to the coagulant, color stabilizer, and antioxidant.

14. The process as in claim 1, further comprising filtering the core-shell polytetrafluoroethylene-based powder to harvest said core-shell polytetrafluoroethylene-based powder produced by the flocculation process.

15. The process as in claim 14, wherein the core-shell polytetrafluoroethylene-based powder is dried at a temperature of between 75° C. and 90° C. subsequent filtering thereof.

* * * * *